US008126081B2

(12) United States Patent
Yin et al.

(10) Patent No.: US 8,126,081 B2
(45) Date of Patent: Feb. 28, 2012

(54) SIGNAL MODULATION APPARATUS, SIGNAL MODULATION METHOD, AND COMPUTER PROGRAM PRODUCT

(75) Inventors: Hua-Chiang Yin, Taoyuan County (TW); Hsien-Wei Tseng, Fongshan (TW); Yang-Han Lee, Jhongli (TW); Yih-Guang Jan, Taipei (TW); Yun-Hsih Chou, Taipei County (TW); Ming-Hsueh Chuang, Taipei (JP); Hsi-Chun Tseng, Pingjhen (TW); Chih-Hsiang Tseng, Taipei (TW); Youn-Tai Lee, Yonghe (TW)

(73) Assignee: Institute for Information Industry, Taipei (TW)

( * ) Notice: Subject to any disclaimer, the term of this patent is extended or adjusted under 35 U.S.C. 154(b) by 602 days.

(21) Appl. No.: 12/277,791

(22) Filed: Nov. 25, 2008

(65) Prior Publication Data

US 2010/0061436 A1 Mar. 11, 2010

(30) Foreign Application Priority Data

Sep. 5, 2008 (TW) ............................... 97134174 A

(51) Int. Cl.
*H04K 1/02* (2006.01)
*H04L 25/03* (2006.01)
*H04L 25/49* (2006.01)

(52) U.S. Cl. ......................... 375/296; 375/224; 375/285

(58) Field of Classification Search .................. 375/224, 375/227, 259–260, 267, 295, 285, 296; 370/241, 370/249, 252; 455/423–425, 63.1, 67.11, 455/67.14
See application file for complete search history.

(56) References Cited

U.S. PATENT DOCUMENTS 5,425,076 A * 6/1995 Knippelmier .............. 379/27.04
2003/0162539 A1* 8/2003 Fiut et al. ...................... 455/424

* cited by examiner

*Primary Examiner* — Jean B Corrielus
(74) *Attorney, Agent, or Firm* — Patterson Thuente Christensen Pedersen, P.A.

(57) ABSTRACT

A signal modulation apparatus, a signal modulation method and a computer program product thereof are provided. The signal modulation apparatus is used in a communication framework consisting of a plurality of communication systems. The communication systems comprise a first communication system having a first antenna and a second communication system having a second antenna. The signal modulation apparatus is configured to generate isolation information to modulate a power of a first antenna according to specification information of the first communication system, specification information of the second communication system, information of the first antenna, information of the second antenna, distance information of the first antenna and the second antenna, and test information.

9 Claims, 7 Drawing Sheets

SIGNAL MODULATION APPARATUS, SIGNAL MODULATION METHOD, AND COMPUTER PROGRAM PRODUCT

This application claims the benefit of priority based on Taiwan Patent Application No. 097134174 filed on Sep. 5, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a signal modulation apparatus, a signal modulation method and a computer program product thereof. More specifically, the present invention relates to a signal modulation apparatus, a signal modulation method and a computer program product thereof for use in a communication framework including a plurality of F communication systems.

2. Descriptions of the Related Art

With continuous advancement in science and technology, people are imposing ever higher requirements on communications. Over recent years, more importance is being attached to convenience of communications in addition to requirements on quality of communications. Wireless communications are advantageous in that they provide higher mobility by obviating the need of physical communication network wiring. Therefore, wireless-communication-enabled products such as mobile phones, notebook computers and the like are more popular and have become the mainstream products in the consumer electronics market.

However, wireless communication systems communicate information through radio waves in the air, so the communication environment in which they operate is rather complex and liable to interference. Moreover, when two different wireless communication systems, e.g. a global system for mobile communication (GSM) and a worldwide interoperability for microwave access (WiMAX) system, may also be exposed to interference from each other because their antennas are too close to cause problems with communication quality.

To describe the problem of signal interference in more detail, a schematic view illustrating signal interference of two communication systems is illustrated in FIG. 1. The horizontal axis f represents frequencies occupied by the communication systems, the vertical axis S represents a frequency spectrum of a first communication system, and the vertical axis S' represents a frequency spectrum of a second communication system. It can be seen from FIG. 1 that a signal 11 transmitted by the first communication system and a signal 12 transmitted by the second communication system have an overlapped region which is known as an interference region 13. When the area of the interference region 13 is larger, the interference between the signals transmitted by the first and the second communication systems respectively will be more serious.

A conventional solution to this problem is just to measure the interference level on site by technicians and then modulate the transmitting power of respective antennas to avoid signal interference of the two communication systems to each other. This solution is effective, but it still consumes additional and extensive manpower and time, causing increased operational cost of the wireless communication service providers.

In view of this, a need still remains in the art to effectively mitigate signal interference between two communication systems due to too close deployment of respective antennas without consuming excessive additional manpower and time.

SUMMARY OF THE INVENTION

An objective of the present invention is to provide a signal modulation apparatus, a signal modulation method for the signal modulation apparatus, and a computer program product thereof. The signal modulation apparatus, which is adapted for use in a communication framework including a plurality of communication systems, is configured to calculate an isolation among individual antennas of the communication systems based on information related to each of the communication systems and antennas thereof thereby to mitigate interference among the antennas.

To this end, the communication framework in which the signal modulation apparatus of the present invention is used comprises a first communication system having a first antenna and a second communication system having a second antenna. The signal modulation apparatus comprises a receiving module, an antenna distance analysis module, a signal noise ratio (SNR) calculation module, a process module, and a filter module. The receiving module is configured to receive specification information of the first communication system, specification information of the second communication system, information of the first antenna, information of the second antenna, distance information of the first antenna and the second antenna, and test information. The antenna distance analysis module is configured to calculate return-loss information according to the information of the first antenna, the information of the second antenna, and the distance information. The signal noise ratio (SNR) calculation module is configured to calculate an SNR according to the specification information of the first communication system. The process module is configured to generate adjustment information according to the SNR, the test information, the specification information of the first communication system and the specification information of the second communication system, and to generate isolation information according to the return-loss information, the adjustment information and the specification information of the first communication system. The filter module is configured to modulate a power of the first antenna according to the isolation information.

Also to this end, the present invention provides the signal modulation method for use in the signal modulation apparatus. The signal modulation method comprises the steps of: (a) receiving specification information of the first communication system, specification information of the second communication system, information of the first antenna, information of the second antenna, distance information of the first antenna and the second antenna, and test information; (b) calculating return-loss information according to the information of the first antenna, the information of the second antenna, and the distance information; (c) calculating an SNR according to the specification information of the first communication system; (d) generating adjustment information according to the SNR, the test information, the specification information of the first communication system and the specification information of the second communication system; (e) generating isolation information according to the return-loss information, the adjustment information and the specification information of the first communication system; and (f) modulating a power of the first antenna according to the isolation information.

The present invention further provides a computer program product comprising a plurality of instructions stored in a computer readable medium for the signal modulation apparatus of the present invention to perform the signal modulation method described above.

In summary, the present invention mitigates the signal interference between the first and the second antenna by calculating the isolation of the first antenna and the second antenna according to the specification information of the first communication system, the specification information of the second communication system, the information of the first antenna, the information of the second antenna, the distance information of the first antenna and the second antenna and the test information, and modulating a power of the first antenna according to the isolation. In this way, signal interference between two communication systems due to too close deployment of respective antennas can be effectively mitigated without consuming additional manpower and time.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, embodiments will be described to explain the present invention. However, these embodiments are not intended to limit the present invention to any specific environment, applications or particular implementations described in these embodiments. Therefore, the description of these embodiments is only intended to illustrate rather than to limit the present invention. It should be appreciated that, in the following embodiments and the attached drawings, elements not related directly to the present invention are omitted from depiction; and dimensional relationships among individual elements in the attached drawings are illustrated only for ease of understanding, but not to limit the actual scale.

Figure 2:
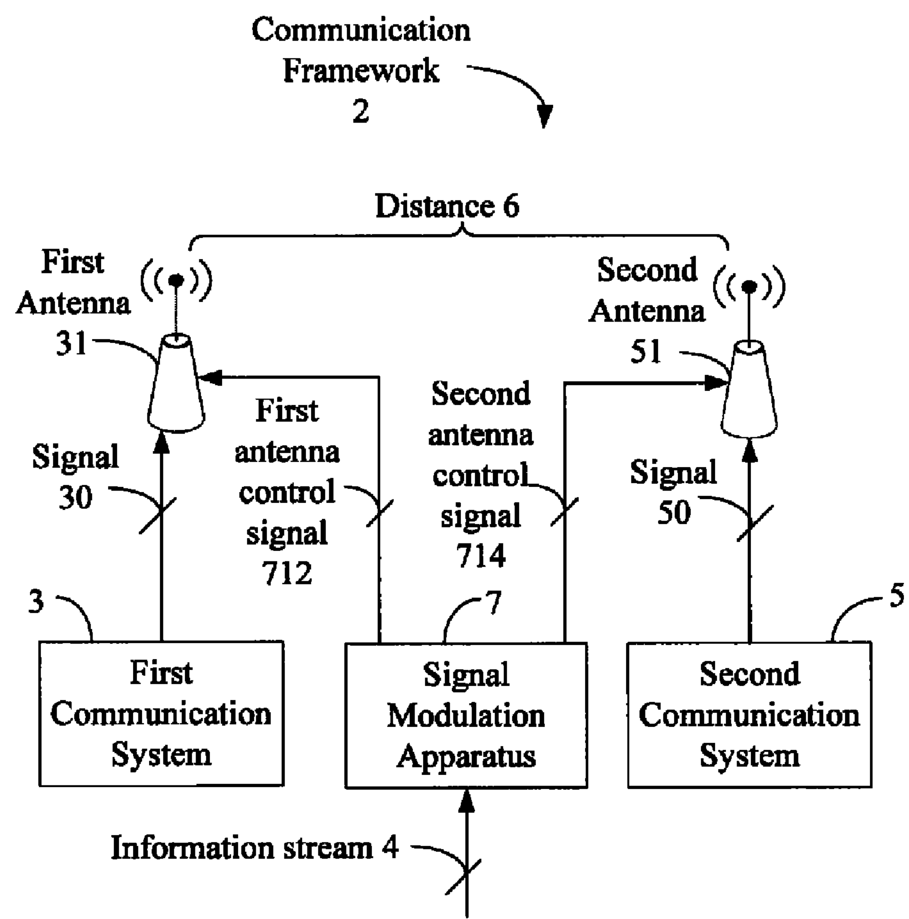
FIG. 2 is a schematic view illustrating a first preferred embodiment of the present invention.
Figure 3:
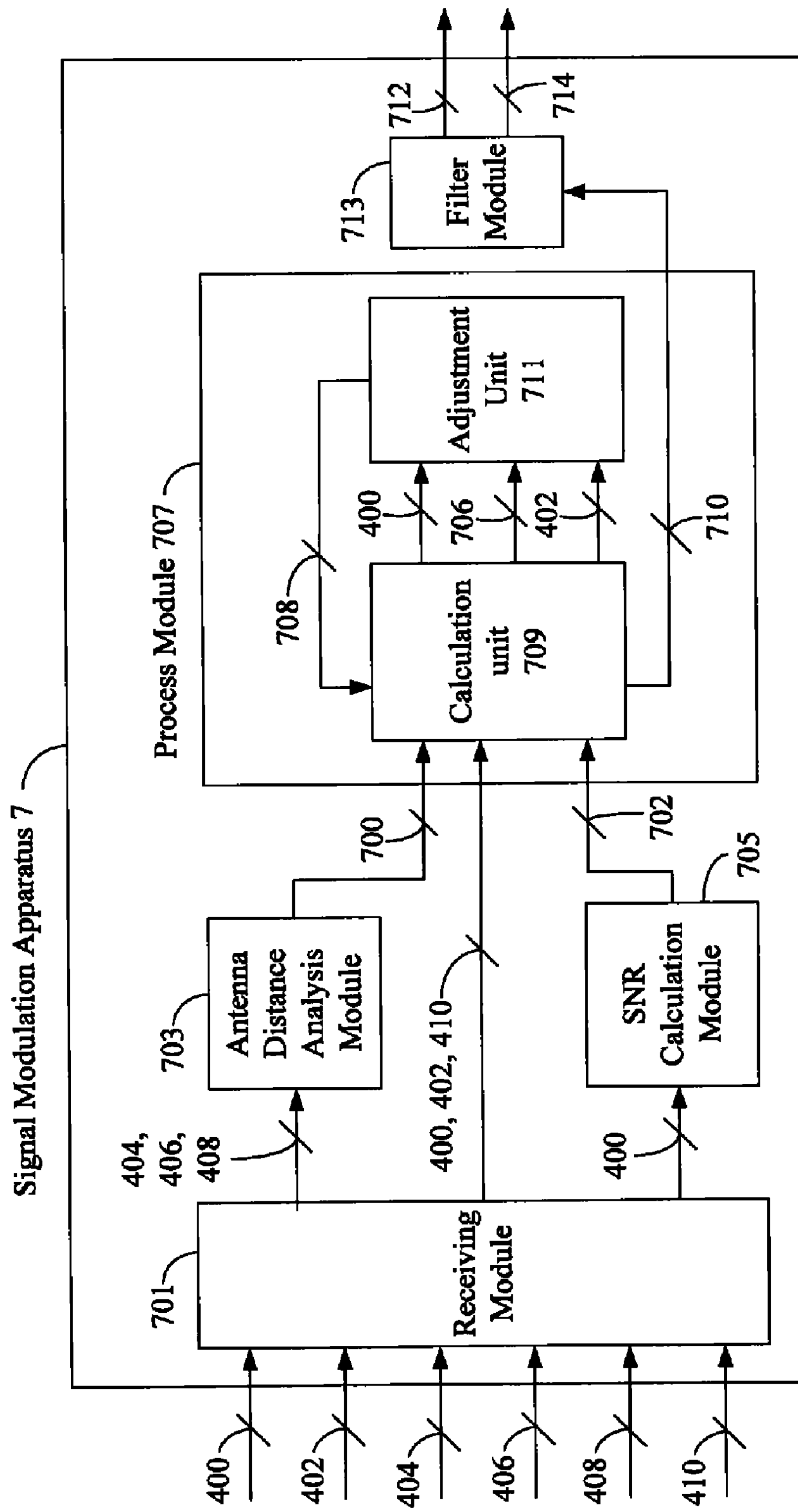
FIG. 3 is a schematic view illustrating a signal modulation apparatus of the first preferred embodiment.

A first preferred embodiment of the present invention is illustrated in FIG. 2 and FIG. 3, In this preferred embodiment, a communication framework 2 includes a plurality of F communication systems comprising a first communication system 3 and a second communication system 5. It should be noted that, the amount of communication systems included in the communication framework is not intended to limit the present invention, and in other embodiments, the communication framework may also include two or more communication systems.

The first communication system 3 has a first antenna 31 which is configured to transmit a signal 30 generated by the first communication system 3. Likewise, the second communication system S has a second antenna 51 which is configured to transmit a signal 50 generated by the second communication system 5. Additionally, in this preferred embodiment, the first antenna 31 and the second antenna 51 are adjacent to each other and disposed with a distance 6 of 5 centimeters (cm). In other embodiments, the first antenna 31 and the second antenna 51 may also have a different distance instead of being merely limited thereto.

In the following description, functions of the signal modulation apparatus 7 disposed in the communication framework 2 will be described. The signal modulation apparatus 7 is configured to receive an information stream 4 and modulate a signal power of the first antenna 31 and/or the second antenna 51 according to the information stream 4. More specifically, the signal modulation apparatus 7 is illustrated in FIG. 3. The signal modulation apparatus 7 comprises a receiving module 701, an antenna distance analysis module 703, an SNR calculation module 705, a process module 707, and a filter module 713.

The receiving module 701 is configured to receive the information stream 4, which comprises specification information 400 of the first communication system 3, specification information 402 of the second communication system 5, information 404 of the first antenna 31, information 406 of the second antenna 51, distance information 408 of the first antenna 31 and the second antenna 51 (i.e., information related to the antenna distance 6), and test information 410. In other words, the receiving module 701 is configured to receive the specification information 400 of the first communication system 3, the specification information 402 of the second communication system 5, the information 404 of the first antenna 31, the information 406 of the second antenna 51, the distance information 408 of the first antenna 31 and the second antenna 51, and the test information 410.

The antenna distance analysis module 703 is configured to calculate return-loss information 700 according to the information 404 of the first antenna 31, the information 406 of the second antenna 51 and the distance information 408. The SNR calculation module 705 is configured to calculate an SNR 702 according to the specification information 400 of the first communication system 3. The process module 707 is configured to generate adjustment information 708 according to the SNR 702, the test information 410, the specification information 400 of the first communication system 3 and the specification information 402 of the second communication system 5, and to generate isolation information 710 according to the return-loss information 700, the adjustment information 708 and the specification information 400 of the first communication system 3. The filter module 713 is configured to modulate a power of the first antenna 31 via a first antenna control signal 712 according to the isolation information 710.

In this preferred embodiment, the information 404 of the first antenna 31 comprises an operational frequency, antenna size, feedline size and ground size of the first antenna 31, while the information 406 of the second antenna 51 comprises an operational frequency, antenna size, feedline size and ground size of the second antenna 51. More specifically, the antenna distance analysis module 703 calculates the return-loss information 700 according to the operational frequency, antenna size, feedline size and ground size of the first antenna 31 as well as the operational frequency, size, feedline size and ground size of the second antenna 51. If the distance information 408 indicates a distance of 5 cm, the antenna distance analysis module 703 will derive return-loss information 700 of 25 dB.

Hereinafter, how the process module 707 generates the isolation information 710 will be described. The process module 707 comprises a calculation unit 709 and an adjustment unit 711. The specification information 400 of first communication system 3 comprises a sampling frequency and a first carrier frequency, and the specification information 402 of the second communication system 5 comprises a second carrier frequency. The test information 410 comprises a channel amount and a fast Fourier transform (FTT) point amount. The calculation unit 709 generates system power information 706 of the first communication system 3 according to a first formula as follows:

$$R = -101 + (SNR)_{RX} + 10 \times \log\left(F_s \times \frac{N_{used}}{N_{FFT}}\right)$$

wherein R represents the system power information 706, $(SNR)_{RX}$ represents the SNR 7025 $F_s$ represents the sampling frequency, $N_{used}$ represents the channel amount, and $N_{FFT}$ represents the FFT point amount. For purpose of illustration, it is assumed that $(SNR)_{RX}$=3, $F_s$=1.75 MHz, $N_{used}$=200 and $N_{FFT}$=256. Accordingly, from the above formula, it is derived that R=−96 dBm. It should be noted that, rather than being limited thereto, numerical values of $(SNR)_{RX}$, $F_s$, $N_{used}$ and $N_{FFT}$ may vary upon practical conditions.

As the first carrier frequency used by the first communication system 3 and the second carrier frequency used by the second communication system 5 are different from each other, the system power information 706 must be adjusted to comply with the second carrier frequency in order to effectively mitigate interference between the first communication system 3 and the second communication system 5. Hence, the adjustment unit 711 is configured to derive the adjustment information according to a second formula as follows:

$$R' = R + 101 \times \log\left(\frac{F_1}{F_2}\right)$$

wherein R' represents adjustment information 708, R represents the system power information 706, $F_1$ represents the second carrier frequency and $F_2$ represents the first carrier frequency. For purpose of illustration, it is assumed that $F_1$=300 kHz, $F_2$=1.75 MHz. Accordingly, by substituting R=−96 dBm into the formula, it is derived that R'=−103.65 dBm. It should be noted that, rather than being limited thereto, numerical values of $F_1$ and $F_2$ may vary upon practical conditions.

Furthermore, the specification information of the first communication system further comprises decay information, and the calculation unit 708 of the process module 707 calculates the isolation information 710 according to a third formula as follows:

$$A_{IF} = R' - A_{RL} - A_{SL}$$

where $A_{IF}$ represents the isolation information 710, R' represents the adjustment information 708, $A_{RL}$ represents the return-loss information 700 and $A_{SL}$ represents the decay information. From this formula, it is derived that $A_{IF}$=−52.65 dB.

Figure 1:
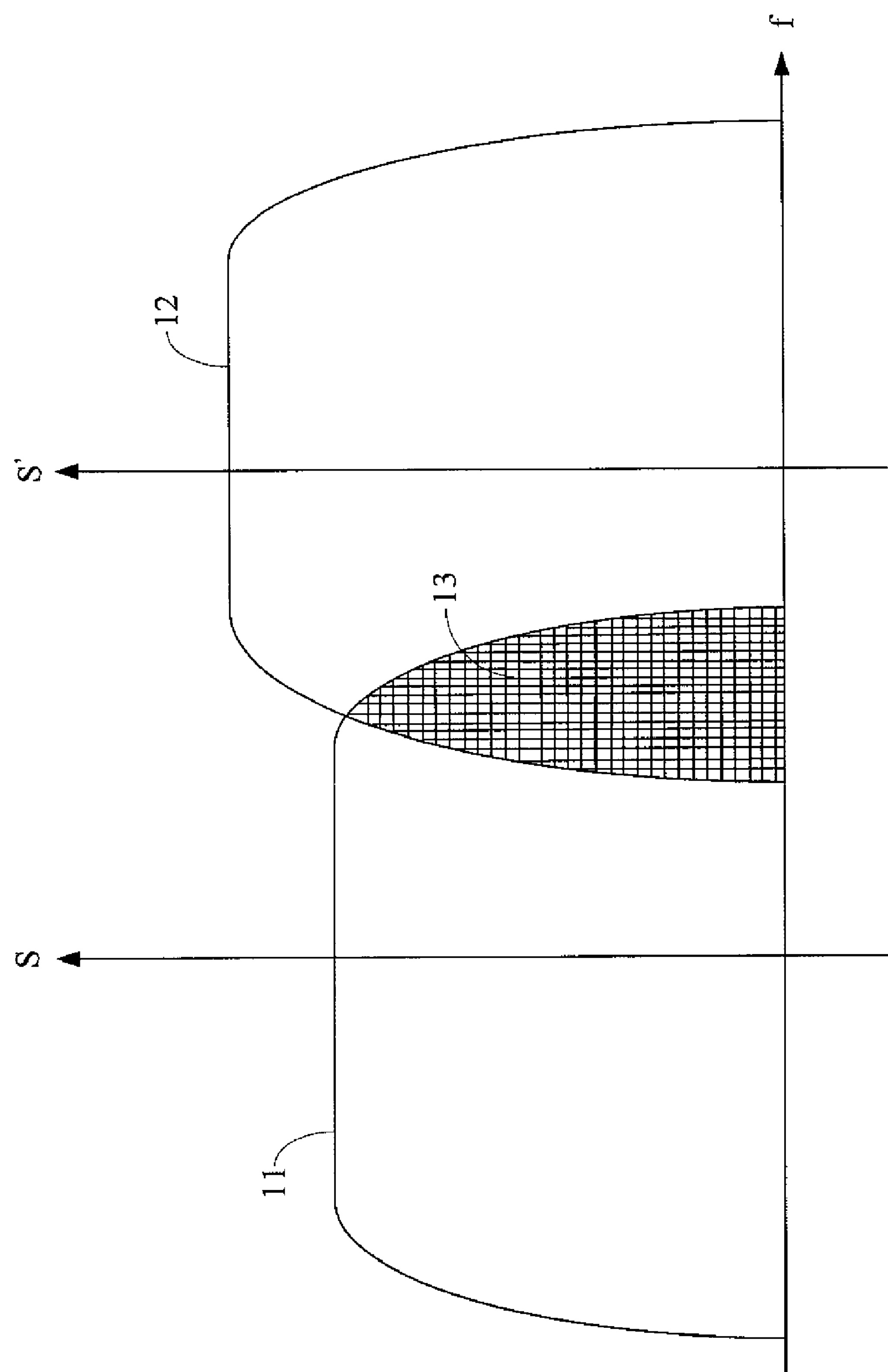
FIG. 1 is a schematic view illustrating signal interference between two communication systems.
Figure 4:
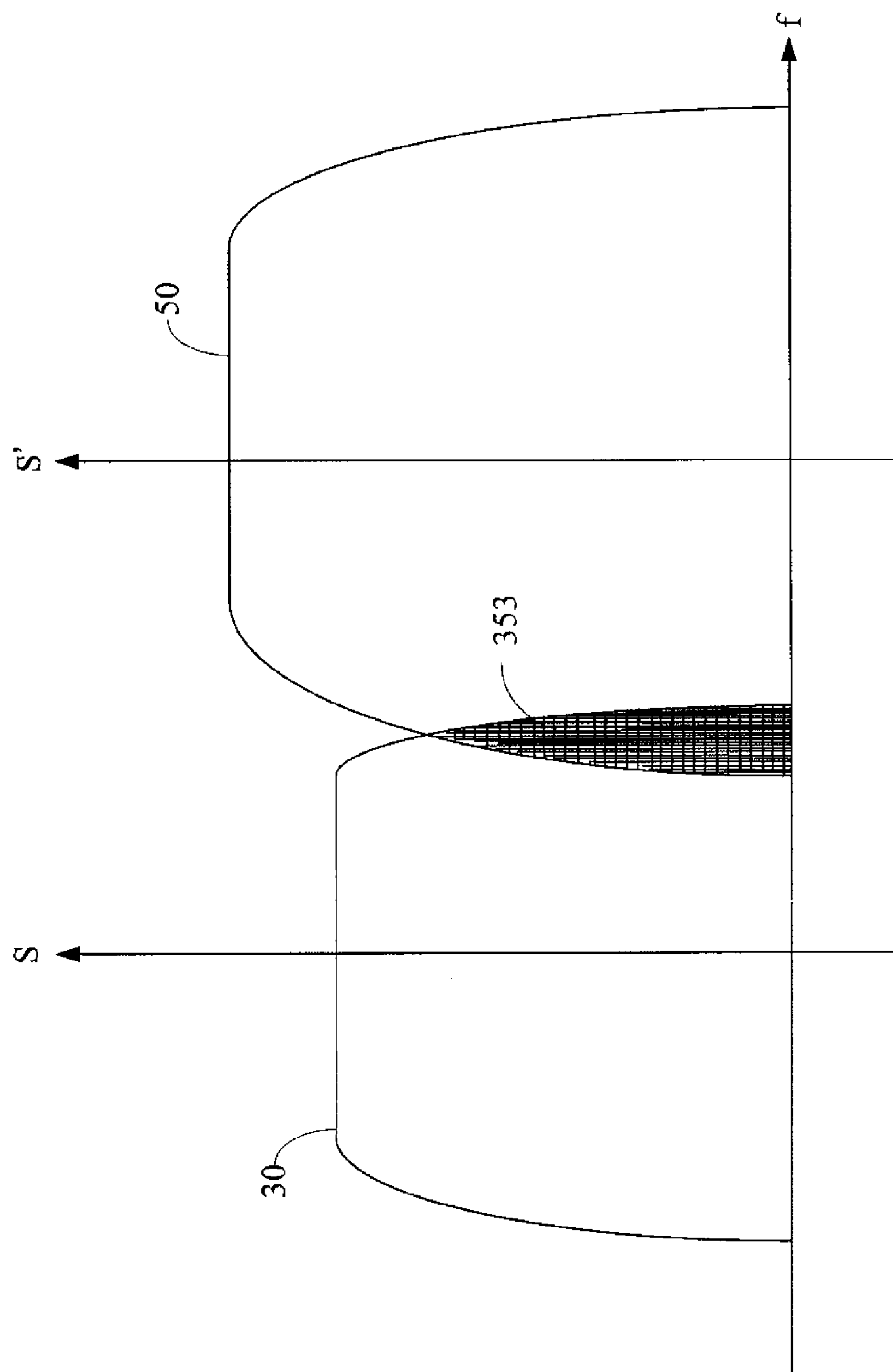
FIG. 4 is a schematic view illustrating signal interference between communication systems of the first preferred embodiment.

After the process module 707 generates the isolation information 710, the filter module 713 modulates a power of the first antenna 31 via the first antenna control signal 712 according to the isolation information 710, so as to mitigate signal interference between the first antenna 31 and the second antenna 51. To clarify that the present invention is able to effectively mitigate signal interference between antennas, please refer to FIG. 4, which is a schematic view illustrating signal interference between the first communication system 3 and the second communication system 5 when only the power of the first antenna 31 was modulated. In FIG. 4, the horizontal axis f represents frequencies occupied by the communication systems, the vertical axis S represents a frequency spectrum of the first communication system 3, and the vertical axis S' represents a frequency spectrum of the second communication system 5. It can be seen from FIG. 4, a signal 30 transmitted by the first communication system and a signal 50 transmitted by the second communication system have an overlapped region which is known as an interference region 353. As compared to the interference region 13 shown in FIG. 1, the interference region 353 is reduced in area, which means that the signal interference between the first communication system 3 and the second communication system 5 is mitigated.

Additionally, the signal modulation apparatus 7 of the present invention may also modulate the power of the second antenna 51 via a second antenna control signal 714. Based on the above description of modulating the power of the first antenna 31 via the first antenna control signal 712, those skilled in the art may readily appreciate how the signal modulation apparatus 7 of the present invention modulates the power of the second antenna 51 via the second antenna control signal 714 and hence, this will not be further described herein.

Figure 5:
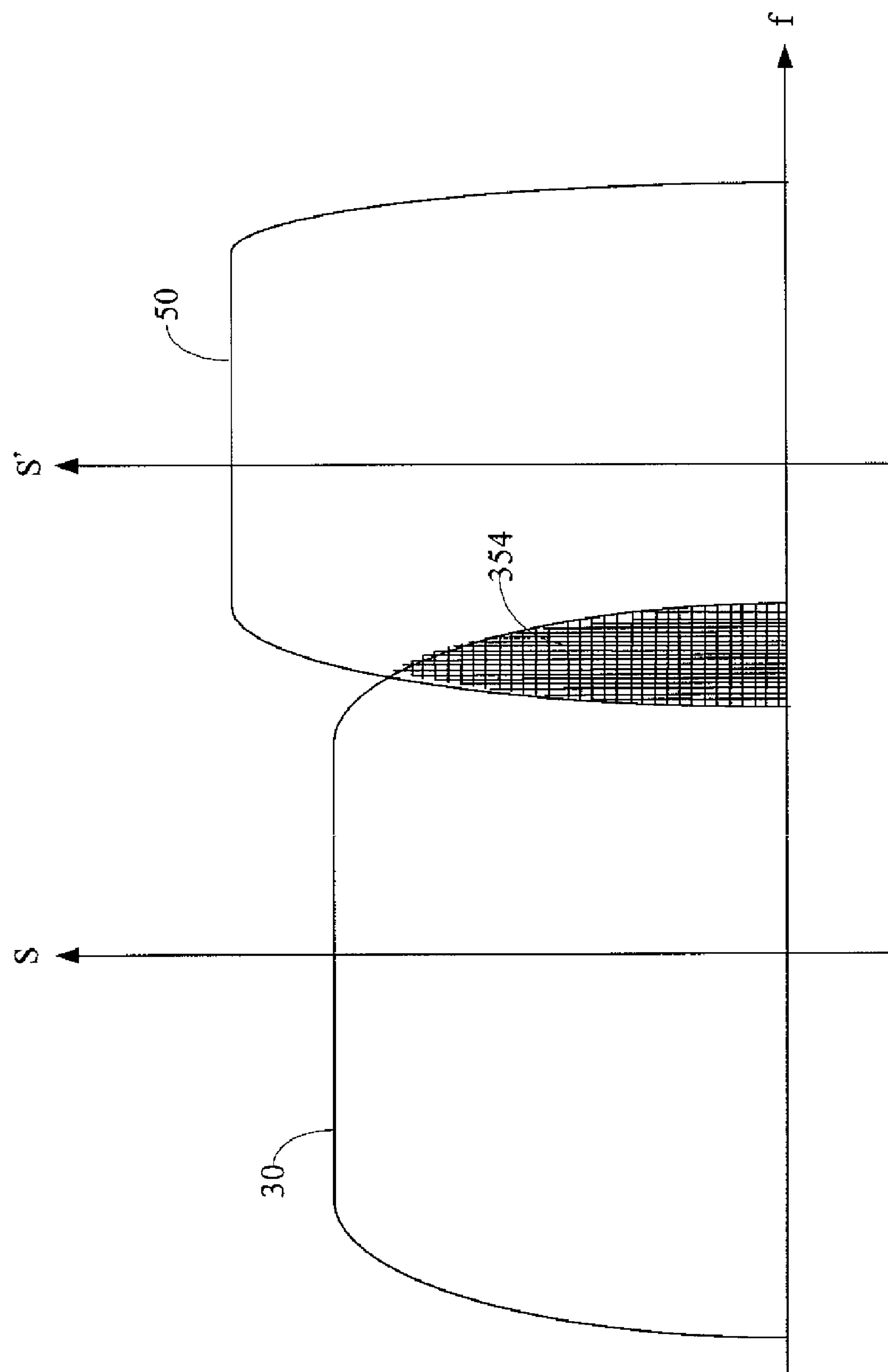
FIG. 5 is another schematic view illustrating signal interference between communication systems of the first preferred embodiment.

To illustrate effectiveness of modulating the power of the second antenna 51 by the signal modulation apparatus 7 more clearly, please refer to FIG. 5 which is a schematic view illustrating signal interference between the first communication system 3 and the second communication system 5 when only the power of the second antenna 51 is modulated. In FIG. 5, the horizontal axis f represents frequencies occupied by the communication systems, the vertical axis S represents a frequency spectrum of the first communication system 3, and the vertical axis S' represents a frequency spectrum of the second communication system 5. It can be seen from FIG. 5 that, the signal 30 transmitted by the first communication system and the signal 50 transmitted by the second communication system have an overlapped region which is known as an interference region 354. As compared to the interference region 13 shown in FIG. 1, the interference region 353 is reduced in area, which means that the signal interference between the first communication system 3 and the second communication system 5 is mitigated.

Figure 6:
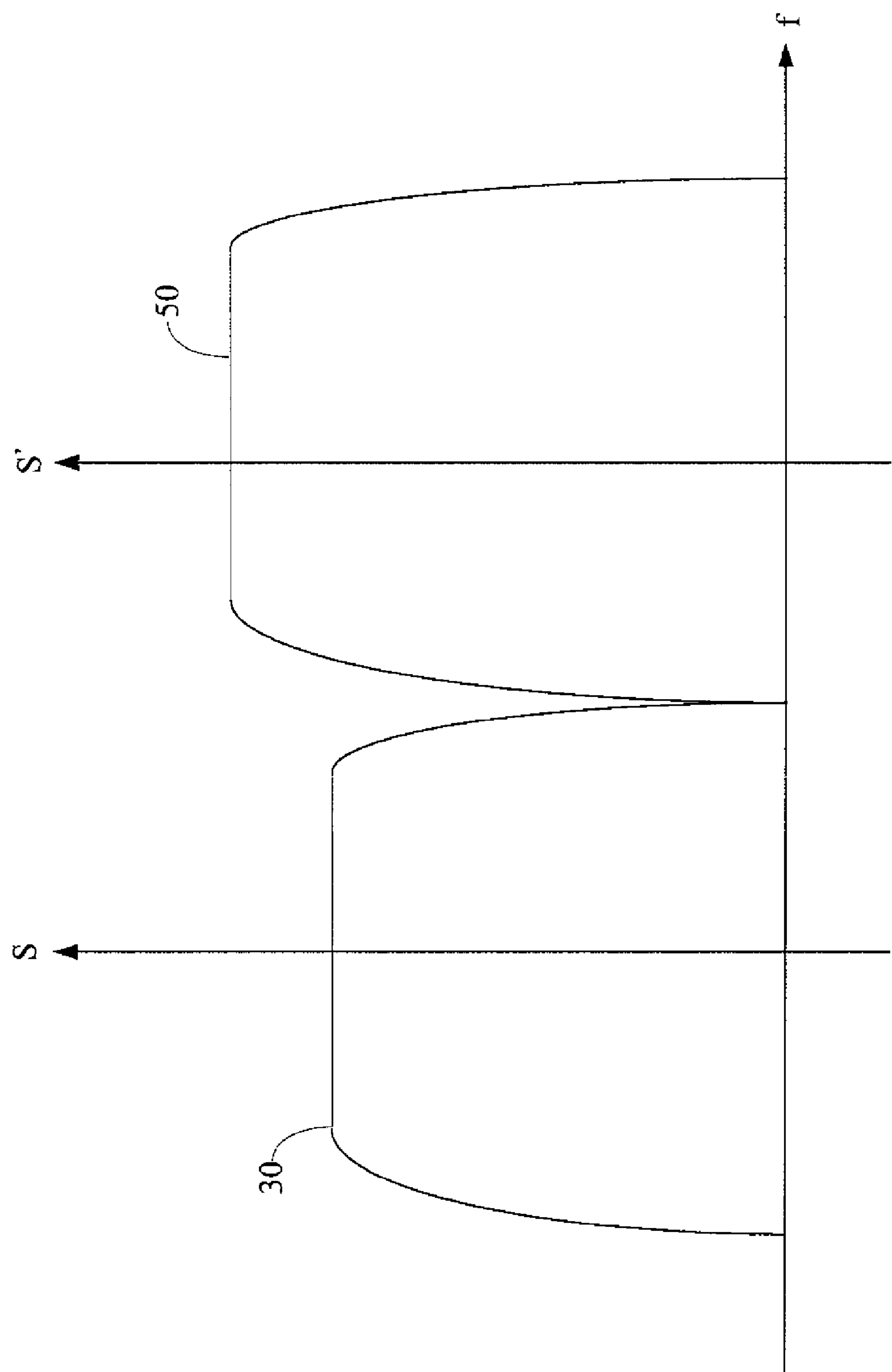
FIG. 6 is a further schematic view illustrating signal interference between communication systems of the first preferred embodiment.

Furthermore, if the signal power of both the first antenna 31 and the second antenna 51 is modulated sequentially, signal interference between the first communication system 3 and the second communication system 5 will be further mitigated. To more clearly illustrate effectiveness of modulating the power of both the first antenna 31 and the second antenna 51 by the signal modulation apparatus 7, please refer to FIG. 6 which is a schematic view illustrating signal interference between the first communication system 3 and the second communication system 5 when the power of both the first antenna 31 and the second antenna 51 was modulated. In FIG. 6, the horizontal axis f represents frequencies occupied by the communication systems, the vertical axis S represents a frequency spectrum of the first communication system 3, and the vertical axis S' represents a frequency spectrum of the second communication system 5. It can be seen from FIG. 6 that, the interference region between the signal 30 transmitted by the first communication system and the signal 50 transmitted by the second communication system is eliminated, which means that almost no signal interference occurs between the first communication system 3 and the second communication system 5.

The signal modulation apparatus 7 of the present invention is adapted for use in a communication framework including a plurality of communications systems, and is configured to calculate necessary isolation between different antennas according to S information related to each of the communication systems and antennas thereof, thereby to effectively mitigate interference between individual antennas. Consequently, shortcomings i of the prior art get overcome.

Figure 7:
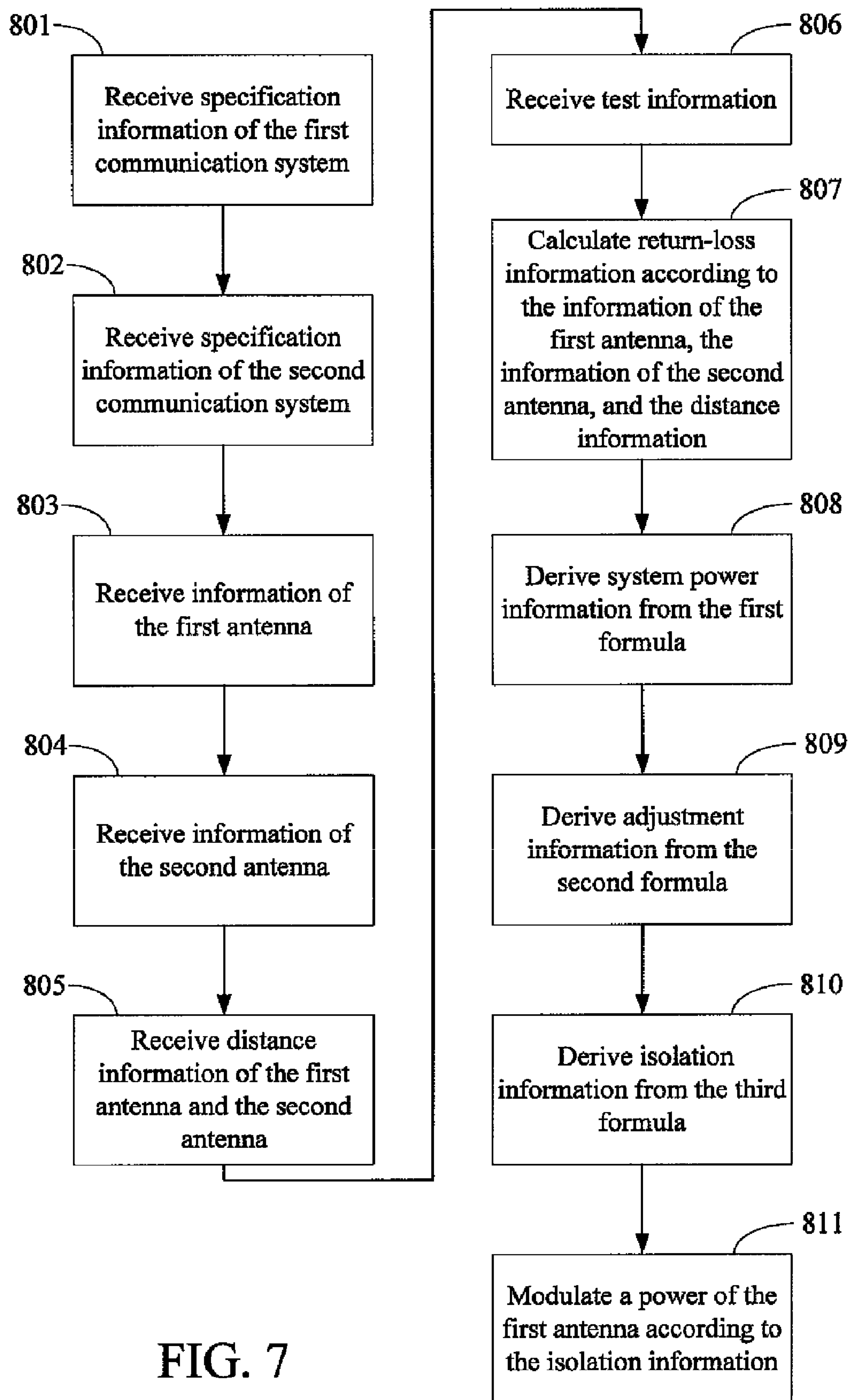
FIG. 7 is a flow chart of a second preferred embodiment of the present invention.

A second preferred embodiment of the present invention is illustrated in FIG. 7, which is a signal modulation method for use in the signal modulation apparatus 7 of the first embodiment. The signal modulation apparatus 7 is used in a communication framework 2 comprising a plurality of communication systems, which include a first communication system 3 having a first antenna 31 and a second communication system 5 having a second antenna 51. More specifically, the signal modulation method of the second embodiment may be implemented by a computer program product. When the computer program product is loaded into the signal modulation apparatus 7 via a computer and a plurality of instructions of the computer program product is executed, the signal modulation method of the second embodiment can be accomplished. This computer program product may be stored in a computer readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Initially in step 801, specification information of a first communication system is received. Then in step 802, specification information of the second communication system is received. In step 803, information of a first antenna is received. Next in step 804, information of a second antenna is received. In step 805, distance information of the first antenna and the second antenna is received, and in step 806, test information is received.

Subsequently in step 807, return-loss information is calculated according to the information of the first antenna, the information of the second antenna, and the distance information. In step 808, system power information is derived from a first formula, which is the same as that of the first embodiment and will not be described again herein. Then in step 809, adjustment information is derived from a second formula, which is also the same as that of the first embodiment and will not be described again herein. Next in step 810, isolation information is derived from a third formula, which is also the same as that of the first embodiment and will not be described again herein. Finally in step 811, a power of the first antenna is modulated according to the isolation information.

In addition to the aforesaid steps, the second embodiment can also execute all the operations and functions described in the first embodiment. The method in which the second embodiment executes these operations and functions will be readily appreciated by those of ordinary skill in the art based on the explanation of the first embodiment, and thus will not be further described herein.

Accordingly, the present invention mitigates the signal interference between the first and the second antenna by calculates a degree of isolation of the first antenna and the second antenna according to the specification information of the first communication system, the specification information of the second communication system, the information of the first antenna, the information of the second antenna, the distance information of the first antenna and the second antenna and the test information, and modulating a power of the first antenna according to the isolation. In this way, signal interference between two communication systems due to too close deployment of respective antennas can be effectively mitigated without consuming additional manpower and time.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A signal modulation apparatus for use in a communication framework including a plurality of communication systems, the communication systems comprising a first communication system having a first antenna and a second communication system having a second antenna, the signal modulation apparatus comprising:

a receiving module being configured to receive specification information of the first communication system, specification information of the second communication system, information of the first antenna, information of the second antenna, distance information of the first antenna and the second antenna, and test information;

an antenna distance analysis module being configured to calculate return-loss information according to the information of the first antenna, the information of the second antenna, and the distance information;

a signal noise ratio (SNR) calculation module being configured to calculate an SNR according to the specification information of the first communication system;

a process module being configured to generate adjustment information according to the SNR, the test information, the specification information of the first communication system and the specification information of the second communication system, and to generate isolation information according to the return-loss information, the adjustment information and the specification information of the first communication system; and a filter module being configured to modulate a power of the first antenna according to the isolation information.

2. The signal modulation apparatus as claimed in claim 1, wherein the specification information of the first communication system comprises a sampling frequency and a first carrier frequency, the specification information of the second communication system comprises a second carrier frequency, the test information comprises a channel amount and a fast Fourier transform (FFT) point amount, the process module comprises:

a calculation unit being configured to calculate system power information according to the following formula:

$$R = -101 + (SNR)_{RX} + 10 \times \log\left(F_s \times \frac{N_{used}}{N_{FFT}}\right)$$

wherein R represents the system power information, $(SNR)_{RX}$ represents the SNR, Fs represents the sampling frequency, $N_{used}$ represents the channel amount, and $N_{FFT}$ represents the FFT point amount; and an adjustment unit being configured to generate the adjustment information according to the following formula:

$$R' = R + 101 \times \log\left(\frac{F_1}{F_2}\right)$$

wherein R' represents the adjustment information, R represents the system power information, $F_1$ represents the second carrier frequency, and $F_2$ represents the first carrier frequency.

3. The signal modulation apparatus as claimed in claim 2, wherein the specification information of the first communication system further comprises decay information, the calculation unit of the process module generates the isolation information according to the following formula:

$$A_{IF} = R' - A_{RL} - A_{SL}$$

wherein $A_{IF}$ represents the isolation information, R' represents the adjustment information, $A_{RL}$ represents the return-loss information, and $A_{SL}$ represents the decay information.

4. A signal modulation method for use in a signal modulation apparatus, the signal modulation apparatus being provided for use in a communication framework including a plurality of communication systems, the communication systems comprising a first communication system having a first antenna and a second communication system having a second antenna, the signal modulation method comprising the steps of:

(a) receiving specification information of the first communication system, specification information of the second communication system, information of the first antenna, information of the second antenna, distance information of the first antenna and the second antenna, and test information;

(b) calculating return-loss information according to the information of the first antenna, the information of the second antenna, and the distance information;

(c) calculating an SNR according to the specification information of the first communication system;

(d) generating adjustment information according to the SNR, the test information, the specification information of the first communication system and the specification information of the second communication system;

(e) generating isolation information according to the return-loss information, the adjustment information and the specification information of the first communication system; and (f) modulating a power of the first antenna according to the isolation information.

5. The signal modulation method as claimed in claim 4, wherein the specification information of the first communication system comprises a sampling frequency and a first carrier frequency, the specification information of the second communication system comprises a second carrier frequency, the test information comprises a channel amount and an FFT point amount, the step (d) comprises the steps of:

calculating system power information according to the following formula:

$$R = -101 + (SNR)_{RX} + 10 \times \log\left(F_s \times \frac{N_{used}}{N_{FFT}}\right)$$

wherein R represents the system power information, $(SNR)_{RX}$ represents the SNR, Fs represents the sampling frequency, $N_{used}$ represents the channel amount, and $N_{FFT}$ represents the FFT point amount; and generating the adjustment information according to the following formula:

$$R' = R + 101 \times \log\left(\frac{F_1}{F_2}\right)$$

wherein R' represents the adjustment information, R represents the system power information, $F_1$ represents the second carrier frequency, and $F_2$ represents the first carrier frequency.

6. The signal modulation method as claimed in claim 5, wherein the specification information of the first communication system further comprises decay information, the step (e) generates the isolation information according to the following formula:

$$A_{IF} = R' - A_{RL} - A_{SL}$$

wherein $A_{IF}$ represents the isolation information, R' represents the adjustment information, $A_{RL}$ represents the return-loss information, and $A_{SL}$ represents the decay information.

7. A non-transitory computer readable medium for a signal modulation apparatus to perform a signal modulation method, the signal modulation apparatus being provided for use in a communication framework including a plurality of communication systems, the communication systems comprising a first communication system having a first antenna and a second communication system having a second antenna, wherein the computer-readable medium is encoded with a sequence of instructions which when executed by a processor allows the processor to:

receive specification information of the first communication system, specification information of the second communication system, information of the first antenna, information of the second antenna, distance information of the first antenna and the second antenna, and test information;

calculate return-loss information according to the information of the first antenna, the information of the second antenna, and the distance information;

calculate an SNR according to the specification information of the first communication system;

generate adjustment information according to the SNR, the test information, the specification information of the first communication system and the specification information of the second communication system;

generate isolation information according to the return-loss information, the adjustment information and the specification information of the first communication system; and modulate a power of the first antenna according to the isolation information.

8. The non-transitory computer readable medium as claimed in claim 7, wherein the specification information of the first communication system comprises a sampling frequency and a first carrier frequency, the specification information of the second communication system comprises a second carrier frequency, the test information comprises a channel amount and an FFT point amount, and the sequence of instructions further causes the processor to:

generate system power information according to the following formula:

$$R = -101 + (SNR)_{RX} + 10 \times \log\left(F_s \times \frac{N_{used}}{N_{FFT}}\right)$$

wherein R represents the system power information, $(SNR)_{RX}$ represents the SNR, Fs represents the sampling frequency, $N_{used}$ represents the channel amount, and $N_{FFT}$ represents the FFT point amount; and generate the adjustment information according to the following formula:

$$R' = R + 101 \times \log\left(\frac{F_1}{F_2}\right)$$

wherein R' represents the adjustment information, R represents the system power information, $F_1$ represents the second carrier frequency, and $F_2$ represents the first carrier frequency.

9. The non-transitory computer readable medium as claimed in claim 8, wherein the specification information of the first communication system further comprises decay information, and the isolation information is generated according to the following formula:

$$A_{IF}=R'-A_{RL}-A_{SL}$$

wherein $A_{IF}$ represents the isolation information, R' represents the adjustment information, $A_{RL}$ represents the return-loss information, and $A_{SL}$ represents the decay information.

* * * * *

UNITED STATES PATENT AND TRADEMARK OFFICE

CERTIFICATE OF CORRECTION

PATENT NO. : 8,126,081 B2
APPLICATION NO. : 12/277791
DATED : February 28, 2012
INVENTOR(S) : Hua-Chiang Yin et al.

It is certified that error appears in the above-identified patent and that said Letters Patent is hereby corrected as shown below:

Title Page;

(75) Inventors:

"Ming-Hsueh Chuang, Taipei (JP)" should be --Ming-Hsueh Chuang, Taipei (TW)--

Signed and Sealed this
Fifteenth Day of May, 2012

David J. Kappos
*Director of the United States Patent and Trademark Office*